(12) United States Patent
Park

(10) Patent No.: US 10,477,163 B2
(45) Date of Patent: Nov. 12, 2019

(54) VIDEO RECORDING METHOD FOR COLLISION AND APPARATUS THEREOF

(71) Applicant: CENTER FOR INTEGRATED SMART SENSORS FOUNDATION, Yuseong-gu, Daejeon (KR)

(72) Inventor: Ki Yeong Park, Daejeon (KR)

(73) Assignee: CENTER FOR INTEGRATED SMART SENSORS FOUNDATION, Yuseong-Gu, Daejeon (KR)

( * ) Notice: Subject to any disclaimer, the term of this patent is extended or adjusted under 35 U.S.C. 154(b) by 3 days.

(21) Appl. No.: 15/579,106

(22) PCT Filed: Jun. 2, 2015

(86) PCT No.: PCT/KR2015/005543
§ 371 (c)(1),
(2) Date: Dec. 1, 2017

(87) PCT Pub. No.: WO2016/195128
PCT Pub. Date: Dec. 8, 2016

(65) Prior Publication Data
US 2018/0176518 A1    Jun. 21, 2018

(51) Int. Cl.
*H04N 7/18* (2006.01)
*G06K 9/00* (2006.01)
*H04N 5/77* (2006.01)
*G08G 1/16* (2006.01)
*B60W 40/04* (2006.01)

(52) U.S. Cl.
CPC ............ *H04N 7/188* (2013.01); *B60W 40/04* (2013.01); *G06K 9/00711* (2013.01); *G06K 9/00805* (2013.01); *G08G 1/166* (2013.01); *H04N 5/77* (2013.01); *G06K 2009/00738* (2013.01)

(58) Field of Classification Search
CPC ......... H04N 7/188; H04N 5/77; B60W 40/04; G06K 9/00805; G08G 1/166
See application file for complete search history.

(56) References Cited

U.S. PATENT DOCUMENTS

| 6,421,080 B1 * | 7/2002 | Lambert | H04N 7/181 348/143 |
| 8,935,045 B2 * | 1/2015 | Kim | G01D 9/005 340/436 |
| 9,235,765 B2 * | 1/2016 | Bentley | G06K 9/00711 |

(Continued)

FOREIGN PATENT DOCUMENTS

| KR | 101015371 | 2/2011 |
| KR | 20120021445 A * | 3/2012 |

(Continued)

*Primary Examiner* — Tat C Chio
*Assistant Examiner* — Michael Robert Cammarata
(74) *Attorney, Agent, or Firm* — Womble Bond Dickinson (US) LLP

(57) ABSTRACT

The present disclosure relates to a video recording method and a video recording apparatus using the same, and relates to a video recording method and a video recording apparatus using the same that detects an obstacle in scene information obtained, calculates a probability index for event occurrence (i.e., a collision) with the obstacle, and changes and stores a resolution of a video, a storing period, a storing location, and so on based on the probability for event occurrence.

10 Claims, 4 Drawing Sheets

(56) References Cited

U.S. PATENT DOCUMENTS

| | | | |
|---|---|---|---|
| 9,743,047 B2 * | 8/2017 | Cho | H04N 7/183 |
| 10,150,447 B2 * | 12/2018 | Yang | G07C 5/0866 |
| 10,248,627 B2 * | 4/2019 | Yang | G06T 1/0007 |
| 2003/0152145 A1 * | 8/2003 | Kawakita | H04N 5/77 375/240.12 |
| 2008/0258885 A1 * | 10/2008 | Akhan | G07C 5/085 340/425.5 |
| 2008/0300731 A1 * | 12/2008 | Nakajima | B60W 50/045 701/1 |
| 2009/0015684 A1 * | 1/2009 | Ooga | G07C 5/008 348/222.1 |
| 2010/0134623 A1 * | 6/2010 | Sakaguchi | B60R 1/00 348/148 |
| 2010/0259373 A1 * | 10/2010 | Chang | G07C 5/0891 340/438 |
| 2012/0303215 A1 * | 11/2012 | Kim | B62D 41/00 701/36 |
| 2013/0253816 A1 * | 9/2013 | Caminiti | G08G 1/0104 701/301 |
| 2014/0012492 A1 * | 1/2014 | Bowers | G08G 1/16 701/301 |
| 2015/0088550 A1 * | 3/2015 | Bowers | G06Q 40/08 705/4 |
| 2016/0295089 A1 * | 10/2016 | Farahani | G07C 5/008 |
| 2018/0048850 A1 * | 2/2018 | Bostick | H04N 5/77 |

FOREIGN PATENT DOCUMENTS

| | | | |
|---|---|---|---|
| KR | 1020140069855 | | 6/2014 |
| KR | 20140127482 A | * | 11/2014 |
| KR | 20150049544 A | * | 5/2015 |

* cited by examiner

VIDEO RECORDING METHOD FOR COLLISION AND APPARATUS THEREOF

BACKGROUND

1. Field of the Disclosure

The present disclosure relates to a video recording method and a video recording apparatus using the same. The preset disclosure relates to a video recording method and a video recording apparatus using the same that detects an obstacle from scene information obtained, calculates a probability index for event occurrence (that is, collision) with the obstacle, and changes and stores a resolution of a video, a storing period, a storing location, and so on based on the probability for event occurrence.

2. Background of the Disclosure

Video recording apparatus that shoots scenes and stores or records information thereon are applied to various application products. As an example, products, such as a video recording device for vehicles that is placed in a vehicle and that records information about ordinary time and events (collision, etc.) when a vehicle is in a driving or parking state, are being released.

Giving explanations with reference to a video recording device to be applied to vehicles, the device is placed in a vehicle and shoots or stores video around the vehicle and provides video data for the investigation of event circumstance if an event occurs (e.g., a collision between cars, a collision between a car and an obstacle, etc.).

The conventional video recording device is generally made in a small size, which has a limitation in having a large-capacity storage device, and it has a problem in that it stores video all the time, which causes the wear of storing devices to quickly proceed and thus a write/read error thereof.

In addition, the conventional video recording device is equipped with a sensor for sensing impact, such as an acceleration sensor, in order to sense the occurrence of event (e.g., collision, etc.), and thereby, it has the feature of storing/managing video information at the time moment of sensing the impact as an event video. However, those video recording devices cannot recognize an impact as an event until an impact occurs. Besides, there is a problem that event information that is sensed by the sensor for sensing impact even includes false positive errors, for example, a speed bump, rough road, impact arising from a car door closing, which makes a user check unnecessary information.

In addition, if a real collision between vehicles occurs, the physical impact on the vehicle and a video recording device installed in the vehicle, may cause problems, such as power down, device damage, detachment of storage medium (e.g., SD card, etc.), and so on. In this case, there is a problem in that the normal operation of the video recording device becomes impossible, and thus, the information on event of the impact cannot be properly stored.

SUMMARY

A video recording method of a video recording apparatus according to an aspect of the present disclosure includes: (A) obtaining scene information; (B) analyzing the obtained scene information and calculating a probability index for event occurrence; and (C) when it comes to storing the scene information obtained via the (A) depending on the calculated probability index for event occurrence, changing at least one selected from a resolution of video and a storing location and storing the scene information.

According to an example of the present disclosure, the (B) may include (B-1) detecting whether there is an obstacle from the scene information obtained via the (A); and (B-2) if the obstacle is detected, calculating a probability index for event occurrence with the obstacle.

In addition, the (B-2) may calculate at least one of a distance to the detected obstacle from the video recording apparatus, a relative velocity of the obstacle with respect to the video recording apparatus, a relative acceleration of the obstacle with respect to the video recording apparatus, and a Time-to-Collision (TTC), and calculates, based on the calculation, a probability index for event occurrence with the obstacle.

In addition, the (C) may increase the resolution of video and decrease the storing period as the calculated probability index for event occurrence is higher.

In addition, the (C) further may change a location for storing a video if the calculated probability index for event occurrence is greater than or equal to a specific value.

In an example of the present disclosure, the video recording method of the video recording apparatus may further include (D) obtaining a still image regarding the scene information obtained via the (A) on a constant cycle if the calculated probability index for event occurrence is greater than or equal to a specific value.

A video recording apparatus according to another aspect of the present disclosure includes: a camera unit that obtains scene information; a unit for calculating a probability index for event occurrence that analyzes the scene information obtained by the camera unit and calculates a probability index for event occurrence; a storing unit that stores the scene information obtained by the camera unit; and a control unit for recording that changes at least one selected from a resolution of video and a storing period based on the probability index for event occurrence obtained by the unit for calculating a probability index for event occurrence.

In this case, the unit for calculating a probability index for event occurrence may detect whether there is an obstacle from scene information obtained by the camera unit, and if the obstacle is detected, calculates a probability index for event occurrence with the obstacle.

In addition, the unit for calculating a probability index for event occurrence may calculate at least one of a distance to the detected obstacle from the video recording apparatus, a relative velocity of the obstacle with respect to the video recording apparatus, a relative acceleration, and a Time-to-Collision (TTC), and calculate, based on the calculation, a probability index for event occurrence with the obstacle.

In addition, the control unit for recording may increase the resolution of video and decrease the storing period as the calculated probability index for event occurrence is higher.

In another example, the storing unit comprises a plurality of storage locations, and the control unit for recording may further change a location for storing a video if the probability index for event occurrence calculated by the unit for calculating a probability index for event occurrence is greater than or equal to a specific value.

In addition, the control unit for recording may further obtain a still image on a constant cycle if the probability index for event occurrence calculated by the unit for calculating a probability index for event occurrence is greater than or equal to a specific value.

An event recording method and an event recording apparatus capable of providing more information regarding the vehicle collision event by determining a possible vehicle collision in advance, before the collision occurs, and starting the event video recording at that time rather than starting the event video recording after the vehicle collision occurs.

In addition, the present disclosure may efficiently store or manage scene information by changing and storing a resolution or a storing period of a video based on a probability index for event occurrence, which is helpful to reduce the size of unnecessary scene information, and may store substantially useful scene information as high-definition scene information, which enables to use it as an evidence for event later if an event occurs.

In addition, if an event, such as a collision between vehicles, occurs, operations of conventional video recording devices may become impossible, but a video recording method and video recording apparatus using the same according to the present disclosure may decrease a period for storing video if a probability index for event occurrence is greater than or equal to a specific value, and thus, it is capable of storing scene information immediately before the occurrence of the event.

In addition, apart from video information, it is capable of having an effect of providing sufficient circumstance information on the real event by providing a still image (image information) regarding the scene depending on a probability index for event occurrence.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The present disclosure is suggested to provide a video recording method and a video recording apparatus using the same capable of storing in advance a video related to an event before an real impact occurs and providing substantially useful event video by controlling a resolution of the event video, a storing period, etc.

In addition, the present disclosure is suggested to provide a video recording method and a video recording apparatus using the same that is capable of minimizing the size of unnecessary scene information by reducing the capacity of scene information having a substantially lower utilization by storing scene information as a low-resolution if a probability of event occurrence is less than or equal to a specific value.

In addition, the present invention is suggested to provide a video recording method and a video recording apparatus using the same that is capable of providing scene information having a substantially higher utilization as well as a still image thereof by periodically storing scene information and still image of the scene information if the probability of event occurrence is greater than or equal to a specific value.

Hereinafter, examples of the present disclosure will be described in detail with reference to the accompanying drawings.

Figure 1:
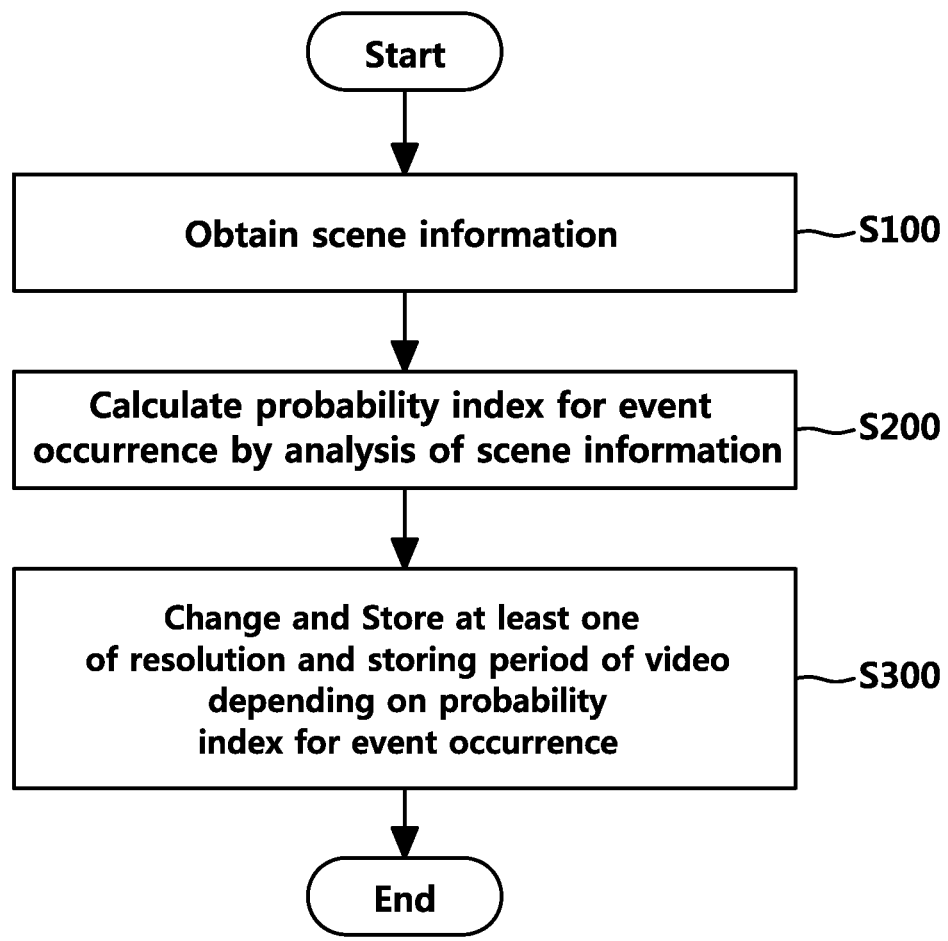
FIG. 1 is a flow chart of a video recording method according to an example of the present disclosure.
Figure 2:
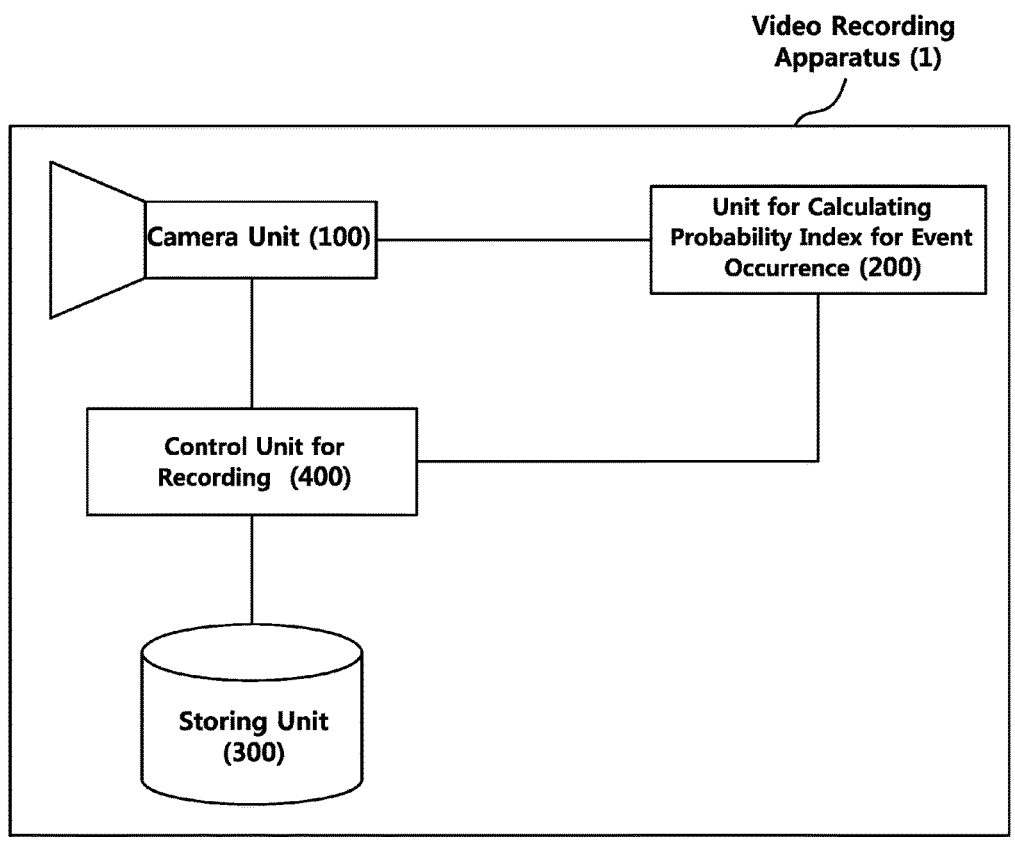
FIG. 2 is a diagram illustrating a video recording apparatus according to another example of the present disclosure.

FIG. 1 is a flow chart of a video recording method according to an example of the present disclosure, and FIG. 2 is a diagram illustrating a video recording apparatus using the video recording method according to FIG. 1.

As illustrated in FIG. 2, a video recording apparatus 1 according to the present disclosure includes a camera unit 100, a unit for calculating a probability index for event occurrence 200, a storing unit 300, and a control unit for recording 400. In FIG. 2, only main components of the video recording apparatus 1 applicable to the present disclosure are illustrated, the video recording apparatus 1 to be substantially implemented and operated may include other components in addition to the components illustrated in FIG. 2.

Hereinafter, each component of the video recording apparatus 1 according to the present disclosure and a video recording method of the video recording apparatus 1 according thereto will be described in detail with reference to the drawings.

The camera unit 100 obtains scene information. In general, the feature of obtaining scene information via the camera unit 100 may be applied, and the feature including a CMOS image sensor (CIS) or CIS+Image Sensor Processor (ISP) may be applied. Besides, the feature of changing information on scene into digital information may be applied by the camera unit 100. It will be understood by a person having ordinary skill in the art that the camera unit 100 may be implemented in various forms without departing from the essential characteristics of the present disclosure.

The unit for calculating a probability index for event occurrence 200 calculates a probability index for event occurrence by analyzing scene information obtained via the camera unit 100.

In the present disclosure, the probability index for event occurrence refers to a value of the anticipated likelihood that an event will occur. The probability index may be a decimal value of 0 to 1 in an example of the present disclosure and be an integer value of 0 to 100 in another example. In addition, the probability index for event occurrence may be classified as a plurality of categories, such as <high> and <low>. Hereinafter, in an example of the present disclosure, the probability index for event occurrence is classified as a plurality of categories; however, in another example, the probability index for event occurrence may be a specific value, and it may apply to the feature of changing and storing the properties of scene information depending on the range of in which the specific value is included.

In examples of the present disclosure, as an event, a collision between an object having a video recording apparatus and an obstacle may be included. For example, the unit for calculating a probability index for event occurrence 200 according to the present disclosure may calculate the probability index for a collision event occurrence between a vehicle having the video recording apparatus and an obstacle outside the vehicle, e.g., a passerby, another vehicle, other objects obstructing driving).

Hereinafter, the detailed description hereof describes the feature that the video recording apparatus 1 is installed in a vehicle and the feature of calculating a probability index for a collision between the vehicle and peripheral obstacle and changing and storing a resolution of a video, a storing period, and so on stored based on the calculated probability index, but the present disclosure is not limited to the examples above. For example, a video recording apparatus 1 according to the present disclosure may be applied to an accessory worn by a passerby (e.g., a child, a handicapped person, etc.) and so on, and a resolution, a storing period, and other things of scene information by determining whether the passerby moves a dangerous area (e.g., an area where walking is restricted, etc.) may be changed.

In examples of the present disclosure, the unit for calculating a probability index for event occurrence 200 detects an obstacle by analyzing scene information obtained by a camera unit 100 and calculates a probability index for event occurrence with the obstacle if the an obstacle is detected.

First, the unit for calculating a probability index for event occurrence 200 detects an obstacle by analyzing scene information obtained by the camera unit 100. In this case, the obstacle may be a person (e.g., a passerby, etc.), an object (e.g., another vehicle, a bicycle, a motorbike, etc.), and an object for division that separates a sidewalk from a road (e.g., a fence).

For example, the unit for calculating a probability index for event occurrence 200 may detect an obstacle by using the technical feature applied to a Forward Collision Warning System (FCWS), which enables the unit for calculating a probability index for event occurrence 200 to detect vehicle A prior to a vehicle, passerby B in front of the vehicle, and so on.

Figure 3:
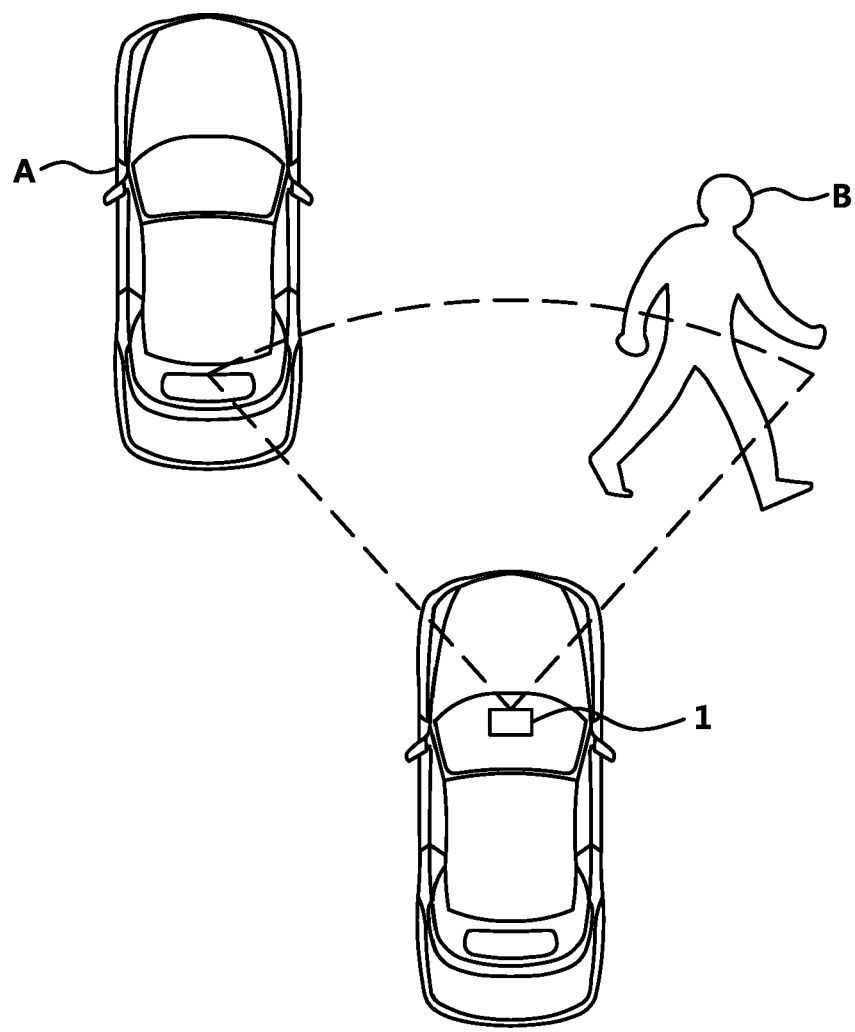
FIG. 3 is a diagram illustrating the technical feature of detecting an obstacle according to the present disclosure.

As illustrated in FIG. 3, in order to detect obstacle A and obstacle B, the unit for calculating a probability index for event occurrence 200 sets an obstacle recognition area among scene information inputted via the camera unit 100, performs video stabilization, and detects a preceding vehicle or other obstacles by detecting horizontal/vertical edge and detecting the bottom and side of an obstacle. It is possible to detect an obstacle such as a vehicle and a passerby from the scene information obtained via the camera unit 100 using another video analysis method, and a person having ordinary skill in the art will easily understand that various video analysis methods may be applied thereto.

If an obstacle is detected, the unit for calculating a probability index for event occurrence 200 calculates a probability index for event occurrence with the obstacle.

The unit for calculating a probability index for event occurrence 200 may use various parameters to calculate probability index for event occurrence. For example, the unit for calculating a probability index for event occurrence 200 may calculate, by analysis of scene information obtained via the camera unit 100, at least one of the distance (L) from video recording apparatus 1 or a vehicle where the video recording apparatus 1 is installed to an obstacle detected, a relative velocity (v) of the obstacle with respect to the video recording apparatus 1 or the vehicle where the video recording apparatus 1 is installed, a relative acceleration (av), and a Time-to-Collision (TTC) and calculate a probability index for event occurrence using that.

For example, the probability index for event occurrence may be classified as four categories such as (none, low, normal, and high), and the above parameters may be used for this. However, the above example is merely one example applicable to the present disclosure, and it is clearly understood that various parameter analysis methods may be applied to.

1. Use of Parameter: Time-to-Collision (TTC)

If an obstacle is detected in scene information, the unit for calculating a probability index for event occurrence 200 may calculate a TTC that is a predictable time to a collision with the obstacle via the analysis of video and use a velocity of movement of the vehicle as additional information. At this time, the probability index for event occurrence may be classified depending on the TTC value calculated as indicated in Table 1 below.

TABLE 1

| TTC (sec) | 0~1 | 1~2 | 2~4 | 4~∞ |
|---|---|---|---|---|
| Probability index for event occurrence | High | Normal | Low | None |

2. Use of Parameters: TTC and Relative Velocity (v)

If an obstacle is detected in scene information, the unit for calculating a probability index for event occurrence 200 may calculate a TTC that is a predictable time to a collision with the obstacle via the analysis of video and calculate a relative velocity (v) of the obstacle with respect to the video recording apparatus 1 (or a vehicle where the video recording apparatus 1 is installed). A velocity of the movement of the vehicle may be used as additional information when calculating the parameter values. At this time, the probability index for event occurrence may be classified depending on the calculated parameters as indicated in Table 2 below.

TABLE 2

| TTC (sec) | 0~1 | 1~2 | 2~4 | 4~∞ |
|---|---|---|---|---|
| v (m/sec) | — | −∞~−20 | −20~0 | — |
| Probability index for event occurrence | High | Normal | Low | None |

In detail, in an example according to Table 2, a probability index for event occurrence may be determined by preferentially using TTC values, and regarding the TTC values in a specific section, the probability index for event occurrence may be classified depending on the size of the relative velocity (v) by additionally using a relative velocity (v) of an obstacle.

Contrary to the above example, a distance to the obstacle (L) other than the relative velocity (v) may be applied for calculation or determination of the probability index for event occurrence. At this time, if the distance (L) regarding the TTC value in a specific section is relatively lower, a relatively higher probability index for event occurrence may be obtained.

3. Use of Parameters: TTC, Relative Velocity (v), and Distance to Obstacle (L)

If an obstacle is detected in scene information, the unit for calculating a probability index for event occurrence 200 may calculate a TTC that is a predictable time to a collision with the obstacle via the analysis of video, a relative velocity (v)

of the obstacle with respect to the video recording apparatus 1 (or a vehicle where the video recording apparatus 1 is installed), and a distance (L) from the video recording apparatus 1 (or a vehicle where the video recording apparatus 1 is installed) to the obstacle. A velocity of the movement of the vehicle may be used as additional information when calculating the parameter values. At this time, the probability index for event occurrence may be classified depending on the calculated parameters as indicated in Table 3 below.

TABLE 3

| TTC (sec) | 0~1 | 1~2 | 2~4 | 4~10 |
|---|---|---|---|---|
| L (m) | — | 0~20 | 20~40 | 40~∞ |
| v (m/sec) | — | — | -∞~-20 | -20~0 |
| Probability index for event occurrence | High | Normal | Low | None |

In detail, in an example according to Table 3, a probability index for event occurrence may be determined by preferentially using TTC values, and regarding the TTC values in specific sections (2~10 sec), the probability index for event occurrence may be calculated (determined) by additionally using a distance to the obstacle (L) and a relative velocity (v) of the obstacle.

The example described using Tables 1 to 3 are merely one example to calculate or determine a probability index for event occurrence by using the parameters, and it is clearly understood that regarding the values indicated in the above tables, other values may be applied in another example.

The storing unit 300 stores scene information. For this purpose, any storage medium capable of storing scene information may be applied to the storing unit 300. For example, every nonvolatile storage medium may be applied to the storing unit 300, and Hard Disk Drive, Solid State Drive, Secure Digital memory card, and so on may be used as well.

In an example according to the present disclosure, the storing unit 300 may include a plurality of separate storage locations. For example, in the case of video recording apparatus applied to a vehicle, the storing unit 300 may include storage locations such as <continuous recording> <event recording> <parking recording>. These storage locations may be classified physically or classified by a software program depending on examples of the present disclosure.

The control unit for recording 400 changes at least one of a resolution or a storing period of video in the storing unit 300 depending on a probability index for event occurrence calculated by the unit for calculating a probability index for event occurrence 200.

In detail, the control unit for recording 400 may change either of or both a resolution of scene information obtained via the camera unit 100 and a storing period for which the scene information is stored depending on a probability index for event occurrence calculated via the control unit for recording 400 and store it or them in the storing unit 300.

Additionally, the control unit for recording 400 may change a storing location of video depending on a probability index for event occurrence calculated by the unit for calculating a probability index for event occurrence 200 and periodically obtain a still image of the video obtained via the camera unit 100 depending on the calculated probability index for event occurrence. At this time, the still image may refer to scene information of one moment that is represented by scene information of one frame, and regarding the still image according to an example, the formats such as Joint Photographic Coding Experts group (JPEG), Portable Network Graphics (PNG), or a file format based upon a software program provided by the video recording apparatus 1 may be applied.

Hereinafter, an example of changing, by the control unit for recording 400, the properties of a video stored in the storing unit 300 is described with reference to FIG. 4.

Figure 4:
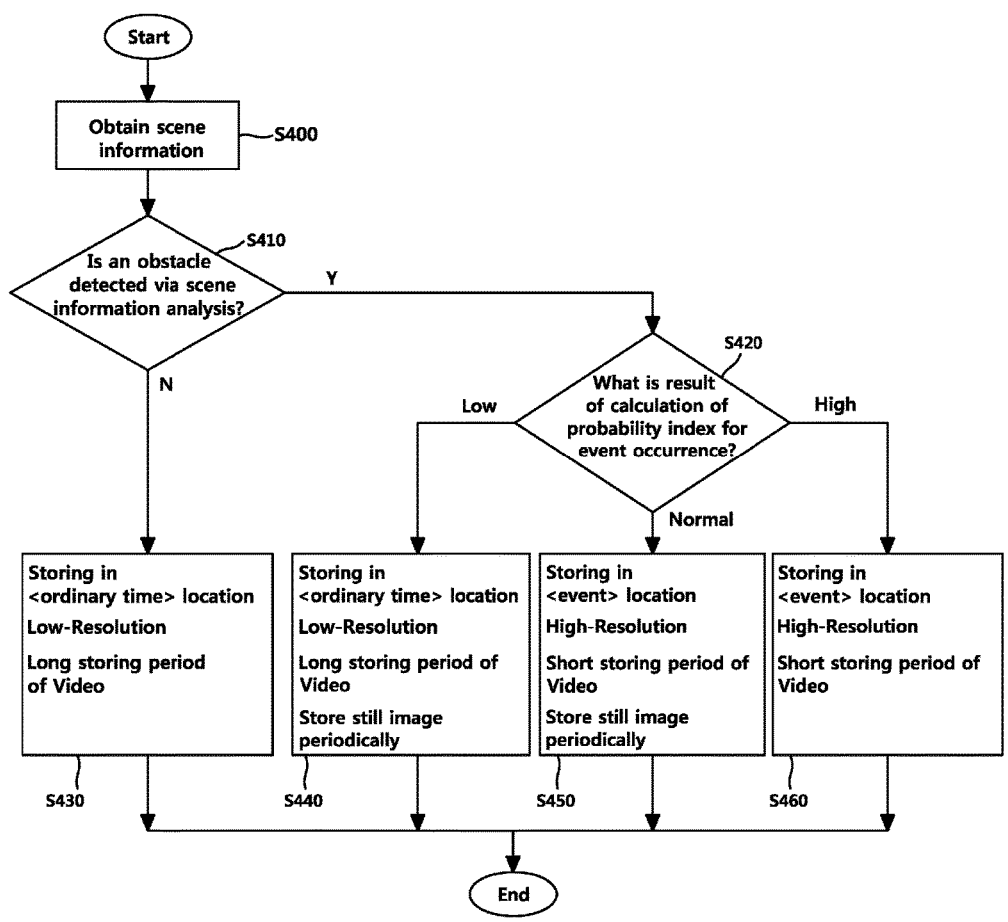
FIG. 4 is a flow chart of a video recording method according to another example of the present disclosure.

FIG. 4 is a flow chart of a video recording method according to another example of the present disclosure.

As illustrated in FIG. 4, video recording apparatus 1 may change the properties of a video obtained by the camera unit 100 through steps S400 to S460 and store it in storing unit 300.

First, the camera unit 100 obtains scene information (S400). Details thereof have been described above, so they will be omitted in the following.

The unit for calculating a probability index for event occurrence 200 detects whether there is an obstacle by analysis of scene information obtained via step S400 (S410). If an obstacle is detected via the step S410, the unit for calculating a probability index for event occurrence 200 calculates a probability index for event occurrence with the obstacle (S420).

In FIG. 4, operations of the unit for calculating a probability index for event occurrence 200 are divided into steps S410 and S420. The step of calculating a probability index for event occurrence is shown in step S420, but in another example according to the present disclosure, the unit for calculating a probability index for event occurrence 200 may calculate the probability index for event occurrence as <none> if an obstacle is not detected via step S410.

In other words, in another example of the present disclosure, the unit for calculating a probability index for event occurrence 200 may calculate at least one of whether there is an obstacle detected by video analysis, a distance to the detected obstacle, a relative velocity of the obstacle with respect to the video recording apparatus, and a TTC and calculate, based on the calculations, a probability index for event occurrence with the obstacle.

In an example, a probability index for event occurrence may be calculated according to the example of Tables 1 to 3, and the probability index for event occurrence may be calculated according to another example. A person having ordinary skill in the art will understand that the operation of the probability index for event occurrence may be implemented in a modified form without departing from the essential characteristics of the present invention.

If an obstacle is not detected via step 410 (by the unit for calculating a probability index for event occurrence 200), the control unit for recording 400 may store scene information obtained by the camera unit 100 in the <ordinary time> location of the storing unit 300, store the scene information as low-resolution scene information, and control the information for a long storing period.

At this time, the low-resolution may refer to a relatively low resolution as compared with steps S450 and S460, and the long storing period also may refer to a relatively long storing period as compared with steps S450 and S460. For example, WVGA (800×480) image resolution may be applied as low-resolution, and Full-HD (1920×1080) image resolution may be applied as high-resolution. In addition, 10 seconds may be applied as the long storing period, and 1 second may be applied as the short storing period.

If an obstacle is detected via step S420 (by the unit for calculating a probability index for event occurrence 200) but the probability index for event occurrence is calculated as <low>, the control unit for recording 400 may store the scene information obtained via the camera unit 100 in the <ordinary time> location of the storing unit 300, store the scene information as low-resolution scene information, and control the information for a long storing period (S440). At this time, contrary to step S430, the control unit for recording 400 may control to periodically obtain a still image regarding the scene information obtained via the camera unit 100. The still image may be stored in the storing unit 300, and it may be stored to be separated from the scene information.

If an obstacle is detected via step S420 (by the unit for calculating a probability index for event occurrence 200) and the probability index for event occurrence is calculated as <normal>, the control unit for recording 400 may store the scene information obtained via the camera unit 100 in the <event> location of the storing unit 300, store the scene information as high-resolution scene information, and control the information for a short storing period (S450). In addition, the control unit for recording 400 may control to periodically obtain a still image regarding the scene information obtained via the camera unit 100. The still image may be stored in the storing unit 300, and it may be stored to be separated from the scene information.

If an obstacle is detected via step S420 (by the unit for calculating a probability index for event occurrence 200) and the probability index for event occurrence is calculated as <high>, the control unit for recording 400 may store the scene information obtained via the camera unit 100 in the <event> location of the storing unit 300, store the scene information as high-resolution scene information, and control the information for a short storing period (S460).

The video recording apparatus 1 according to the present disclosure may change the properties of video (i.e., a resolution, storing period, and storing location) depending on situations and further obtain a still image of the obtained video.

As illustrated in FIG. 4, the video recording method and the video recording apparatus using the same according to the present disclosure may detect an obstacle via the video analysis of scene obtained, calculate a probability index for event occurrence with the obstacle (e.g., a collision, etc.), and control the properties of scene information based thereon. In detail, as a probability index for event occurrence is higher, it is controlled that the resolution of a video is higher and the storing period is shorter. In addition, if the calculated probability index for event occurrence is greater than or equal to a specific value, the storing location of a video may be changed. Further, if the calculated probability index for event occurrence is greater than or equal to a specific value, it may be controlled to further obtain a still image periodically.

According to the technical features above, the video recording apparatus 1 according to the present disclosure may store the scene information at a low-resolution in a normal case, store the scene information at a high-resolution if an occurrence of an event is detected (predicted), and control to store the scene information for a short storing period in order to store as much as possible scene information if the operation of storing scene information becomes impossible due to an event, such as collision and so on. In this way, it may be capable of storing/managing scene information using low-capacity, but storing scene information at a high-resolution and storing scene information up to the time of event as much as possible if the occurrence of an event (i.e., a collision) is predicted.

In addition, if the probability index for event occurrence is greater than or equal to a specific value, it may be capable of obtaining scene information at high-resolution separately from scene information by periodically obtaining a still image of the peripheral environment.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Accordingly, the scope of the present disclosure shall be determined only according to the attached claims.

What is claimed is:

1. A video recording method of a video recording apparatus, comprising:
   (A) obtaining scene image;
   (B) analyzing the obtained scene image and calculating a probability index for collision occurrence; and
   (C) when it comes to storing the scene information obtained via the obtaining scene and the analyzing the calculated probability index for collision occurrence, changing at least one selected from a resolution of a video and a storing interval and storing the scene information;
   wherein the changing comprises starting video recording, and increasing the resolution of video and decreasing the storing interval as the calculated probability index for collision event occurrence is higher.

2. The video recording method of claim 1, wherein the analyzing comprises:
   (B-1) detecting whether there is an obstacle in the scene image obtained via the (A); and
   (B-2) if the obstacle is detected, calculating a probability index for collision occurrence with the obstacle.

3. The video recording method of claim 2,
   wherein the calculating comprises calculating at least one of a distance to the detected obstacle from the video recording apparatus, a relative velocity of the obstacle with respect to the video recording apparatus, a relative acceleration of the obstacle with respect to the video recording apparatus, and a Time-to-Collision (TTC), and calculating, based on the calculation, a probability index for collision occurrence with the obstacle.

4. The video recording method of claim 1,
   wherein the changing further comprises changing a location for storing a video if the calculated probability index for collision occurrence is greater than or equal to a specific value.

5. The video recording method of claim 1, further comprising (D) obtaining a still image regarding the scene obtained via the obtaining scene at a constant interval if the calculated probability index for collision occurrence is greater than or equal to a specific value.

6. A video recording apparatus, comprising:
   a camera that obtains scene image;
   a calculator for calculating a probability index for collision occurrence that analyzes the scene image obtained by the camera and calculates a probability index for collision occurrence;
   a recorder that stores the scene image obtained by the camera; at least one of a distance to the detected obstacle from the event recording apparatus, a relative velocity of the obstacle with respect to the video recording apparatus, a relative acceleration of the obstacle with respect to the video recording apparatus, and a Time-to-Collision (TTC), and
   a controller for recording that changes at least one selected from a resolution and a storing interval of a video in the recorder based on the probability index for collision occurrence calculated by the unit for calculating a probability index for event occurrence;

wherein the controller for recording starts the video recording and increases the resolution of the video and decreases the storing interval as the calculated probability index for collision occurrence is higher.

7. The video recording apparatus of claim 6, wherein the calculator detects whether there is an obstacle in the scene image obtained by the camera, and if the obstacle is detected, calculates a probability index for collision occurrence with the obstacle.

8. The video recording apparatus of claim 7, wherein the calculator calculates at least one of a distance to the detected obstacle from the video recording apparatus, a relative velocity of the obstacle with respect to the video recording apparatus, a relative acceleration of the obstacle with respect to the video recording apparatus, and a Time-to-Collision (TTC) and calculates, based on the calculation, a probability index for collision occurrence with the obstacle.

9. The video recording apparatus of claim 6, wherein the recorder comprises a plurality of storing locations, and wherein the controller for recording further changes a storing location of a video if the probability index for collision occurrence calculated by the controller for calculating a probability index for collision occurrence is greater than or equal to a specific value.

10. The video recording apparatus of claim 6, wherein the controller for recording further obtains a still image at a constant interval if the probability index for collision occurrence calculated by the calculator is greater than or equal to a specific value.

* * * * *